(12) United States Patent
Monk et al.

(10) Patent No.: US 7,393,572 B1
(45) Date of Patent: **\*Jul. 1, 2008**

(54) ANTI-LEAK PROJECTILE BARRIER AND METHOD

(75) Inventors: Russell Allen Monk, Salem, OR (US); James Jackson Milham Henry, Wilsonville, OR (US); Thomas Stegen Ohnstad, Salem, OR (US)

(73) Assignee: High Impact Technology, L.L.C., Tigard, OR (US)

( * ) Notice: Subject to any disclaimer, the term of this patent is extended or adjusted under 35 U.S.C. 154(b) by 205 days.

This patent is subject to a terminal disclaimer.

(21) Appl. No.: 11/411,691

(22) Filed: Apr. 25, 2006

Related U.S. Application Data

(63) Continuation-in-part of application No. 11/067,525, filed on Feb. 25, 2005, now Pat. No. 7,169,452.

(60) Provisional application No. 60/621,263, filed on Oct. 20, 2004, provisional application No. 60/623,723, filed on Oct. 28, 2004, provisional application No. 60/629,259, filed on Nov. 19, 2004, provisional application No. 60/677,884, filed on May 3, 2005.

(51) Int. Cl.
*B32B 25/02* (2006.01)
*B32B 25/04* (2006.01)
*F17C 13/00* (2006.01)

(52) U.S. Cl. ............... 428/35.7; 428/213; 428/215; 428/411.1; 428/911; 428/912; 220/560.02; 220/900

(58) Field of Classification Search ............... 428/35.7, 428/213, 215, 411.1, 911, 912; 220/4.14, 220/562, 560.02, 567.2, 900
See application file for complete search history.

(56) References Cited

U.S. PATENT DOCUMENTS 7,169,452 B1 \* 1/2007 Monk et al. ............... 428/35.7

\* cited by examiner

*Primary Examiner*—Ramsey Zacharia
(74) *Attorney, Agent, or Firm*—Jon M. Dickinson, PC; Robert D. Varitz, PC

(57) ABSTRACT

Barrier structure placeable as a projectile-disabling, anti-liquid-leakage protective shield for the outside surface of a container designed to hold liquid of a certain nature including (a) a first-type (innermost) layer formed as an expanse of high-elastomeric material which is substantially fully self-healing via elastomeric behavior with regard to a piercing projectile wound, (b) a second-type (intermediate) layer disposed adjacent one side of the first-type layer as an expanse including a body of substantially the same high-elastomeric material in which there is contained a distribution of liquid-imbiber beads which react, and expand three-dimensionally in relation, to contact with liquid of the mentioned certain nature, and (c) a third-type (outermost) layer disposed adjacent the second-type layer, and formed as an expanse of substantially the same high-elastomeric material employed in the first- and second-type layers. In one embodiment of the invention, these layers are dimensioned whereby the first- and third-type layers each possesses a thickness substantially twice that of the second-type layer, and in a second invention embodiment, no matter the thickness of the innermost layer, that of the outermost layer is substantially twice that of the intermediate layer.

9 Claims, 1 Drawing Sheet

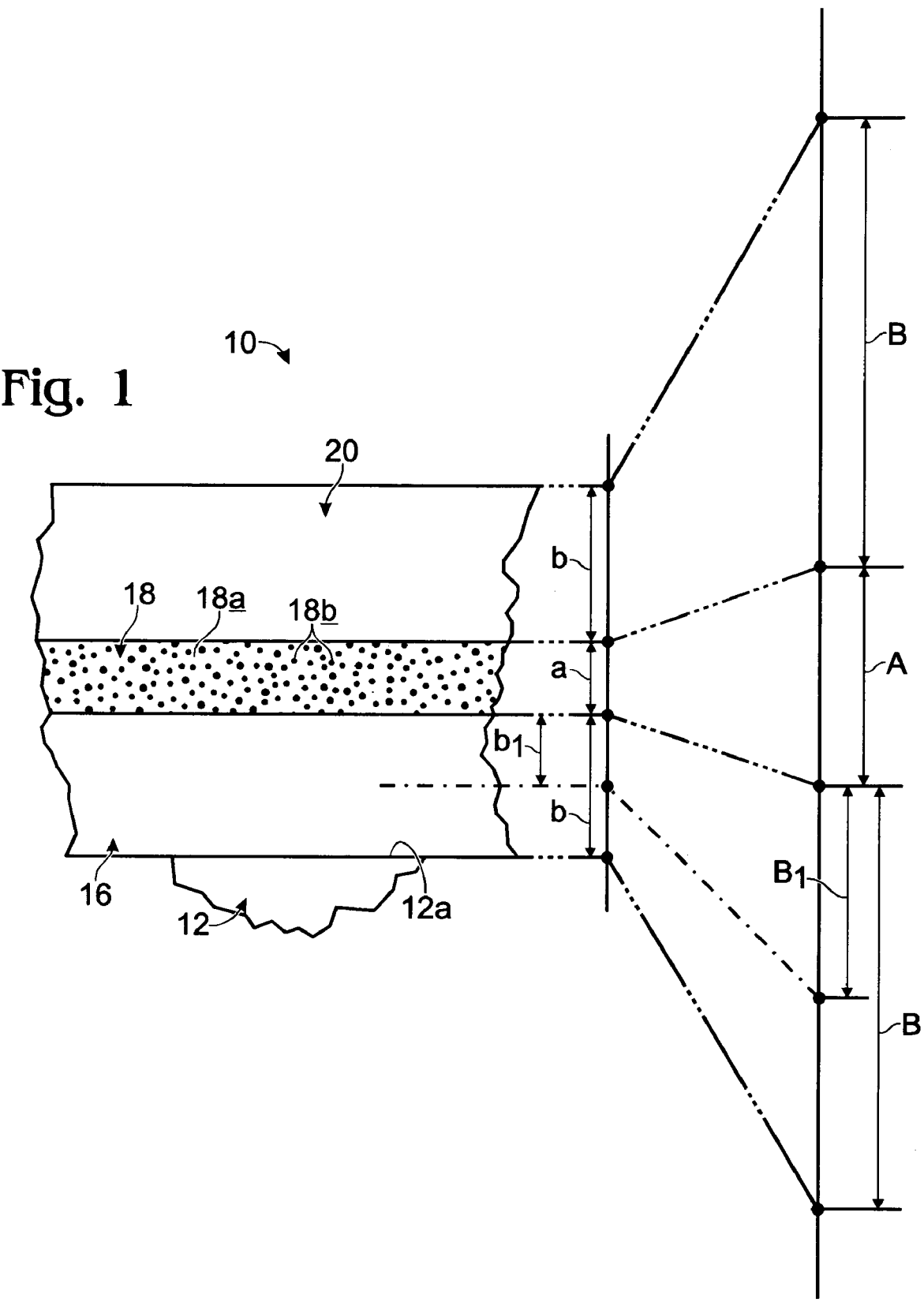

ANTI-LEAK PROJECTILE BARRIER AND METHOD

CROSS REFERENCES TO RELATED APPLICATIONS

This application is a Continuation-in-Part of currently co-pending U.S. Regular patent application Ser. No. 11/067,525, filed Feb. 25, 2005 now U.S. Pat. No. 7,169,452, for "Projectile Barrier and Method", which prior-filed application claims respective priorities to three U.S. Provisional Patent Applications, the entireties of whose disclosure contents were therein incorporated by reference. These three, just-mentioned provisional patent applications, whose respective disclosure contents are also incorporated by reference in the present application, include: (a) U.S. Provisional Patent Application Ser. No. 60/621,263, filed Oct. 20, 2004, for "Projectile Barrier and Method"; (b) U.S. Provisional Patent Application Ser. No. 60/623,723, filed Oct. 28, 2004, for "Projecfile Barrier and Method Including Substance Coagulation"; and (c) U.S. Provisional Patent Application Ser. No. 60/629,259, filed Nov. 19, 2004, for "Differentiated-Thickness Layer-Sandwich Projectile Barrier and Method".

Additionally, the present application claims appropriate priority to currently pending, prior-filed, U.S. Provisional Patent Application Ser. No. 60/677,884, filed May 3, 2005 for "Anti-Leak Projectile Barrier", the entire disclosure content of which is also hereby incorporated herein by reference.

BACKGROUND AND SUMMARY OF THE INVENTION

This invention pertains to a special, self-healing, anti-liquid-leakage projectile barrier structure, and to a related methodology. In particular, it pertains to specific, improved and now recognized forms of the layered barrier structure described in the '723 patent application.

While there are many applications and situations wherein the present invention offers important utility, a preferred and best mode embodiment of, and manner of practicing, the invention are described herein in the setting of an intended disabling projectile attack, such as a sniper bullet attack, on the otherwise exposed fuel tanks in certain types of military vehicles. Although this military environment provides an excellent vehicle for describing the present invention, those skilled in the art will quickly understand from the disclosure herein how the structure and methodology of the invention may be employed with respect to other types of liquid-containing structures (i.e., ground storage tanks, pipelines, etc.).

With respect to this illustrative military use of the present invention, a tactic employed in combat involves directing sniper fire at a vehicle's exposed fuel tank or container. Bullet penetration of such a fuel tank initiates fuel leakage when a puncture occurs, and successful sniper fire which has achieved a puncture in such a tank may then be followed by the firing of incendiary rounds which ignite a catastrophic and life-threatening fire.

According to the present invention, a selected exposed surface of such a tank, or container, is appropriately coated with a multi-layer (and as proposed by the present invention, preferably three-layer), self-healing/self-sealing barrier structure which lies at the heart of the present invention. This layer structure is "sandwich-like" in form. It includes two, outer bracketing layers formed of a high-elastomeric material, with a third, intermediate layer formed as a composite-material layer having a body made of the same high-elastomeric material used in the outer layers, and imbedded within this body, a distribution of bead-like elements (called beads herein) which respond to contact with the usual hydrocarbon fuel to undergo rapid absorption of any leaking fuel, accompanied by rapid, three-dimensional physical enlargement as a consequence of such liquid absorption.

Preferably, the elastomeric material just mentioned is capable, within its range of elasticity, of easily undergoing about a 400-percent stretch. A very suitable material for this purpose is a two-part, bendable product sold under the trademark TUFF STUFF®, and made by Rhino Linings USA, Inc. in San Diego, Calif. Specific product designations for such a two-part Rhino-Linings product are 60012 and 60058.

With respect to the mentioned distribution of bead-like elements, a very suitable material takes the form of what are referred to as liquid-imbiber beads which react to hydrocarbon fuel in the manner mentioned above, and which are made by a company known as Imbibitive Technologies America, Inc. in Midland, Mich. A particular liquid-imbiber-bead product made by this company, and very suitable for use, is a product which is sold under that company's product identification IMB230300.

Those skilled in the art will certainly recognize from the description given below how different, specific elastomeric materials and imbiber, bead-like elements may be selected and used for different kinds of potential liquid leakage.

The present invention specifically focuses upon improved layer-thickness configurations for the basic barrier structure innovation described in certain ones of the above-cross-referenced, prior patent applications. Very specifically, and referring to one preferred form, or embodiment, of the present invention, we have discovered that, within certain ranges of composite-layer thicknesses, a very successfully performing multi-layer (i.e., composite-layer) arrangement includes two outer (innermost and outermost bracketing layers) high-elastomeric layers which possess a common thickness which is substantially twice that of the intermediate composite layer. We have found that a very appropriate range of thicknesses useable for the two outer elastomeric layers is about ¼-inches to about ¾-inches, and that an appropriate related range of layer thicknesses for the intermediate composite layer is about ⅛-inches to about ⅜-inches. With respect to the military-situation conditions described above herein, we have further found that a preferred layer organization is one wherein there is a common layer thickness for each of the two outer layers in the composite, plural-layer structure of the proposed barrier structure, which common thickness is about ¼-inches, with the intermediate composite layer having a thickness of about ⅛-inches.

Another discovery about an improved form of layer arrangement involves a plural-layer composite structure wherein, regardless of innermost layer thickness, so long as that thickness is about ⅛-inches, the outermost layer thickness is about twice that of the intermediate layer thickness. For example, we have found that, for certain applications, this other, preferred, composite layer arrangement can be realized with an innermost layer thickness of about ⅛-inches, an intermediate layer thickness in the range of about ⅛-inches to about 3/16-inches, and an outermost layer thickness (preferably in a 2:1 ratio with the thickness of the intermediate layer) in the range of about ¼-inches to about ⅜-inches, and with an overall composite layer thickness preferably being no less than approximately ⅝-inches.

The various features, advantages, and operating mechanisms which characterize the present invention will now become more fully apparent as the description which follows below is read in conjunction with the single accompanying drawing FIGURE.

DESCRIPTION OF THE DRAWING

FIG. 1, the only drawing FIGURE in this case, provides a simplified, fragmentary and schematic illustration of the barrier structure of the present invention, with this FIGURE, on its right side, generally illustrating, in a stylized, graphic manner, related ranges of respective thicknesses for each of the three layers proposed by the present invention in each of two herein-described preferred embodiments.

DETAILED DESCRIPTION OF THE INVENTION

Turning attention now to the single drawing FIGURE, indicated generally at 10 is a three-layer, sandwich-like barrier layer structure formed in accordance with a preferred and best-mode embodiment of the present invention. This barrier structure is shown in a fully formed condition, prepared on an outer surface 12a in the wall of a hydrocarbon fuel tank 12. For the purpose of principal illustration herein, the present invention is chiefly described and pictured in the context of a layer arrangement prepared in accordance with the first-above-mentioned preferred embodiment, i.e., that embodiment in which the innermost and outermost layers possess a substantially common thickness which is about twice that of the intermediate layer.

Barrier structure 10 is formed with three layers (also referred to herein as sheet-like expanses) including two outer layers 16, 20 between which is disposed an intermediate layer 18. As can be seen, layer 16 lies directly contactively against tank surface 12a; intermediate layer 18 lies contactively adjacent layer 16; and layer 20 lies contactively adjacent layer 18, and on that side of layer 18 which is opposite the side in contact with layer 16. Layer 16 is also referred to herein as the innermost layer, and layer 20 as the outermost layer.

Layers 16, 18, 20, which may be applied in any suitable manner, such as by spraying, possess specially related relative thicknesses, with the thicknesses, also referred to herein as layer thicknesses, of layers 16 and 20 being the same and indicated at "b" in the drawing FIGURE, and that of layer 18 being smaller and indicated at "a" in the figure.

In accordance with practice of the present invention in relation to the particular preferred embodiment now being described, layer thickness b is substantially twice that of layer thickness a, with dimension b being about ¼-inches, and dimension a being about ⅛-inches.

As mentioned earlier herein, we have discovered that there is a suitable appropriate range of layer thicknesses that work well, and this range of layer thicknesses (not necessarily drawn to scale) is suggested toward the right side of FIG. 1 by thickness designators A and B. We have found that, for one preferred implementation of this embodiment of the invention, a suitable, successful range of thicknesses for dimensions b/B is about ¼-inches to about ¾-inches. Relatedly, we have found that an appropriate range of thicknesses a/A for intermediate layer 18 is about ⅛-inches to about ⅜-inches.

A second preferred embodiment of the invention, useable in certain applications, is one in which innermost layer 16 has a thickness of about ⅛-inches, intermediate layer 18 has a thickness lying in the range of about ⅛-inches to about 3/16-inches, and outermost layer 20 has a thickness lying in the range of about ¼-inches to about ⅜-inches, with all such thickness dimensions chosen to produce an overall composite layer thickness which is no less than approximately ⅝-inches. These second-embodiment dimensions and ranges appear (not necessarily in scale) at a/A, b/B, and $b_1/B_1$ on the right side of FIG. 1. Preferably, and in accordance with this embodiment of the invention, regardless of the size of dimension $b_1/B_1$, dimension b/B is always prepared to be about twice the value of dimension a/A.

Layers 16, 20 are preferably each formed herein substantially solely from the high-elastomeric material mentioned above. Intermediate layer 18 is preferably created with a body 18a formed of this same high-elastomeric material, in which body there is a distribution of bead-like imbiber components, or elements, 18b. These imbiber elements are preferably those mentioned earlier herein. An appropriate organization of the components making up layer 18 is such that the imbiber bead components make up about 22-percent by weight in layer 18.

Barrier structure 10 responds to a penetrating projectile attack relative to container 12 with several, important, cooperative mechanisms. One of these mechanisms employs elastic stretch-and-recovery of the elastomeric materials utilized in the three, illustrated layers. Another mechanism involves the behavior of the bead-like elements in layer 18, which elements respond to any contact with leaking fuel to undergo a rapid absorption of that fuel, accompanied by rapid, three-dimensional physical enlargement (about 300- to about 400-percent) on account of such absorption. Still another mechanism implemented by the structure of this invention involves the use of the mentioned bead-like elements in layer 18 to undergo a kind of congealing action on contact with leaking fuel, which action results in a tacky and sticky thickened mass of material which tends to flow to form a continuum across a projectile penetration wound in the overall layer structure.

It additionally turns out that the specific high-elastomeric material mentioned above and employed in each of layers 16, 18, 20 also absorbs, or imbibes, a certain amount of leakage liquid, and also engages, as a consequence, a certain amount of three-dimensional swelling, both of which actions contribute to self-sealing of a puncture wound.

A further feature which contributes to self-sealing is that fluid absorption by the high-elastomeric in layer body 18a functions to expose many fully embedded bead elements 18b, i.e., such elements which are beyond the specific boundaries of penetration-passage, leaking-liquid contact.

As those skilled in the art will appreciate, there are many specific ways of creating a multi-layer barrier structure in accordance with the present invention, including various specific ways in which the bead-like imbiber elements in intermediate layer 18 may be introduced into the body of elastomeric material which contains them. The present invention does not concern itself with these "ways". Rather, it involves, per se, a multi-layer barrier structure of the type illustrated and described herein, applied through appropriate steps, such as by spraying steps, to apply to a liquid-container surface each of the three barrier layer structures, beginning with the application of layer structure 16, followed by the application of intermediate layer structure 18, and concluding with the application of exposed layer structure 20. Creation of these three layer structures to possess the relative layer (or sheet) thicknesses described herein may be performed also in any suitable manner, the details of which do not form part of the present invention.

With respect to spray application and creation of the several barrier-structure layers that are associated with implementation and practice of this invention, a word here about the use of a "receiving-surface" primer for layer adhesion assistance will be useful.

Where the receiving surface is either metal, or painted metal, as specifically described hereinabove, that surface should be completely dry before primer application. For an unpainted metal surface, normally no special surface texturing is necessary before primer application. However, where painted metal is involved, paint-surface profiling to produce about a 1- to about a 3-mil texture is recommended.

To such a surface, an appropriate primer, such as the so-called System 251 primer made by Rhino Linings, USA, Inc. (mentioned earlier herein), may be used. This primer preferably is applied to create a primer layer having a thickness lying in the range of about 2- to about 5-mils. Manufacturer's instructions are entirely adequate to describe both the details of applying this primer to different surfaces, and the conditions which, after primer application, should be observed to indicate readiness of the primer to receive a first, sprayed overlayer, such as innermost elastomeric layer 16 discussed herein, which lies closest to the outer surface, such as outer surface 12*a*, of a protected liquid container.

After application of this innermost elastomeric layer, and with regard to the recommended use or non-use of such a primer in an interlayer manner as successive barrier-structure layers, such as layers 18 and 20, are sprayed into place, we have found that no primer is needed if the relevant interlayer spray interval is less than about 4-hours. If such an interval is greater than about 4-hours, primer use is recommended. The same System 251 primer may be used for such interlayer conditions.

Where the receiving surface for the innermost, barrier-structure high-elastomeric layer is the outer surface of a plastic container, such as the outer surface of an HDPE fuel tank in a military vehicle, two things preferably should be done to prepare such a surface for elastomeric layer receipt. First, the surface should be scrubbed/scuffed, as with a rotary wire cup brush, to roughen the surface, and to remove any "surface gloss" of this surface. Next, an appropriate adhesion-promoting primer should be sprayed onto the scuffed surface. A suitable primer is the two-part catalyzed product known as DPX-801 plastic adhesive primer made by PPG Industries of Strongsville, Ohio.

Interlayer primer use here should be based upon the same time-interval consideration just discussed above, and an appropriate interlayer primer is the mentioned System 251 primer.

Accordingly, and with respect to the general foundation barrier layer structure which is described in the referenced '723 patent application, the present invention builds improvingly on that innovation by recognizing and specifying certain relative layer thicknesses which have been found especially to co-act in various advantageous manners. The specific thicknesses of layers which are chosen to deal with providing anti-liquid-leakage protection for a particular surface are readily determinable by those skilled in the art who choose to practice this invention. With respect to the specific, preferred thicknesses set forth herein relating to two preferred embodiments for layer structure 10, these dimensionalities have been found to be extremely appropriate and advantageous in the context of military fuel-tank structures wherein low weight and high performance need to combine effectively.

Thus, while preferred and best mode embodiments of the present invention have been illustrated and described herein, it is appreciated that variations and modifications, apart from those which have been suggested above, may be made without departing from the spirit of this invention.

We claim:

1. Barrier structure placeable as a projectile-disabling, anti-liquid-leakage protective shield adjacent a vulnerable outside surface in a container designed to hold liquid of a certain nature, said structure comprising a first-type barrier layer formed as a sheet-like expanse of high-elastomeric material which is substantially fully self-healing via elastomeric behavior with regard to a piercing projectile wound, a second-type barrier layer disposed contactively adjacent one side of said first-type barrier layer as a sheet-like expanse including a body of substantially the same high-elastomeric material utilized for said first-type barrier layer, in which body there in contained a distribution of elemental, bead-like liquid-imbiber components which react, and expand three-dimensionally in relation, to any direct contact with liquid of the above-mentioned certain nature, and a third-type barrier layer disposed contactively adjacent that side of said second-type barrier layer which is opposite the side thereof in contact with said first-type barrier layer, with this third-type barrier layer being formed as a sheet-like expanse of substantially the same high-elastomeric material which is employed in said first-type and second-type barrier layers, said three barrier layers being dimensioned, with respective layer thicknesses, in a manner whereby said first-type and said third-type barrier layers each possesses a layer thickness which is substantially twice that of said second-type barrier layer.

2. The barrier structure of claim 1, wherein said high-elastomeric material is also of a type which expands reactively and three-dimensionally swellingly in relation to any direct contact with liquid of the mentioned certain nature.

3. The barrier structure of claim 1, wherein said first-type and said third-type barrier layers each possesses a layer thickness of about ¼-inches, and said second-type barrier layer possesses a layer thickness of about ⅛-inches.

4. The barrier structure of claim 1, wherein said first-type and third-type barrier layers each possesses a layer thickness lying generally within the range of about ¼-inches to about ¾-inches, and the layer thickness of said second-type barrier layer lies generally within the range of about ⅛-inches to about ⅜-inches.

5. The barrier structure of claim 1, wherein the liquid of the mentioned certain nature takes the form of a hydrocarbon fuel.

6. Barrier structure placeable as a projectile-disabling, anti-liquid-leakage protective shield adjacent a vulnerable outside surface in a container designed to hold liquid of a certain nature, said structure comprising a first-type barrier layer formed as a sheet-like expanse of high-elastomeric material which is substantially fully self-healing via elastomeric behavior with regard to a piercing projectile wound, adapted to have one side placed directly adjacent such an outside surface, a second-type barrier layer disposed contactively adjacent the side of said first-type barrier layer which is opposite said one side as a sheet-like expanse including a body of substantially the same high-elastomeric material utilized for said first-type barrier layer, in which body there in contained a distribution of elemental, bead-like liquid-imbiber components which react, and expand three-dimensionally in relation, to any direct contact with liquid of the above-mentioned certain nature, and a third-type barrier layer disposed contactively adjacent that side of said second-type barrier layer which is opposite the side thereof in contact with said first-type barrier layer, with this third-type barrier layer being formed as a sheet-like expanse of substantially the same high-elastomeric material which is employed in said first-type and second-type barrier layers, said three barrier layers being dimensioned, with respective layer thicknesses, in a manner whereby said third-type barrier layer possesses a layer thickness which is substantially twice that of said second-type barrier layer.

7. The barrier structure of claim 6, wherein said high-elastomeric material is also of a type which expands reactively and three-dimensionally swellingly in relation to any direct contact with liquid of the mentioned certain nature.

8. The barrier structure of claim 6, wherein the liquid of the mentioned certain nature takes the form of a hydrocarbon fuel.

9. The barrier structure of claim 6, wherein said third-type barrier layer possesses a layer thickness lying generally within the range of about $1/4$-inches to about $3/8$-inches, and the layer thickness of said second-type barrier layer lies generally within the range of about $1/8$-inches to about $3/16$-inches.

* * * * *